United States Patent
Smith et al.

(10) Patent No.: US 8,396,733 B2
(45) Date of Patent: Mar. 12, 2013

(54) DECISIONING FRAMEWORK

(75) Inventors: Kenton C. Smith, Monroe, NC (US);
Ruben C. Berumen, Miami, FL (US);
Richard T. Mattingly, Charlotte, NC (US); Jason Daniel Latta, Charlotte, NC (US); Anurag Amatya, Denver, CO (US); John A. Curl, Belmont, NC (US); David Stuart Rietz, Charlotte, NC (US); Clifford Todd Barnett, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 162 days.

(21) Appl. No.: 12/900,649

(22) Filed: Oct. 8, 2010

(65) Prior Publication Data
US 2012/0089431 A1    Apr. 12, 2012

(51) Int. Cl.
*G06Q 10/00* (2012.01)
(52) U.S. Cl. .................................................. 705/7.12
(58) Field of Classification Search ................. 705/7.12
See application file for complete search history.

(56) References Cited

U.S. PATENT DOCUMENTS

| | | | |
|---|---|---|---|
| 6,895,382 B1 * | 5/2005 | Srinivasan et al. | 705/7.17 |
| 2007/0033060 A1 * | 2/2007 | Gopalan et al. | 705/1 |
| 2008/0103804 A1 * | 5/2008 | Latta et al. | 705/1 |
| 2008/0270363 A1 * | 10/2008 | Hunt et al. | 707/3 |
| 2008/0288209 A1 * | 11/2008 | Hunt et al. | 702/179 |
| 2010/0114622 A1 * | 5/2010 | Hardee et al. | 705/7 |
| 2011/0054973 A1 * | 3/2011 | Deich et al. | 705/8 |

* cited by examiner

*Primary Examiner* — Johnna Loftis
(74) *Attorney, Agent, or Firm* — Banner & Witcoff, Ltd.; Michael A. Springs

(57) ABSTRACT

A system and method of determining a recommended location for performing a work function is provided. In some examples, the system and method may include receiving a plurality of process criteria, such as hours of operation associated with the work function, type of work performed, skill set desired, language skills desired, and the like. The system and method may further include receiving a plurality of provider attributes, such as languages spoken, knowledge base/skill set, flexibility of staffing, and the like. One or more recommended locations for performing the work function may be determined based on the business and provider attributes.

22 Claims, 9 Drawing Sheets

DECISIONING FRAMEWORK

BACKGROUND

In today's corporate world, improvements in efficiency, reduction in costs and improvement in customer service are factors to success. Accordingly, companies are constantly striving to achieve these factors. However, increasing numbers and types of options for providing services, performing work functions, and the like may complicate business decisions. Further, subjective decision making at various levels within a business entity may result in inconsistent decisions throughout the business entity, which may result in additional complexities as companies strive to improve efficiency, reduce costs and improve customer service. Accordingly, a decisioning framework to aid in providing consistent, repeatable decisions and recommendations would be advantageous.

SUMMARY

The following presents a simplified summary in order to provide a basic understanding of some aspects of the present disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

According to one or more aspects, a system and method of determining a recommended location for performing a work function is provided. In some examples, the system and method may include receiving, at a location decisioning system, a plurality of process criteria, such as hours of operation associated with the work function, type of work performed, skill set desired, communication skills desired, and the like. The system and method may further include receiving a plurality of provider attributes, such as languages, dialects, and the like, spoken, knowledge base/skill set, flexibility of staffing, and the like. One or more recommended locations for performing the work function may be determined based on the business and supplier attributes.

In some examples, a hybrid arrangement may be available in which the work function is performed by both a work group internal to the business entity and an external supplier. In some arrangements, the system and method may determine whether this hybrid arrangement is available and/or whether it is advantageous and may include this information in a location recommendation.

BRIEF DESCRIPTION OF THE DRAWINGS

The present disclosure is illustrated by way of example and not limited in the accompanying figures in which like reference numerals indicate similar elements.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

Figure 1:
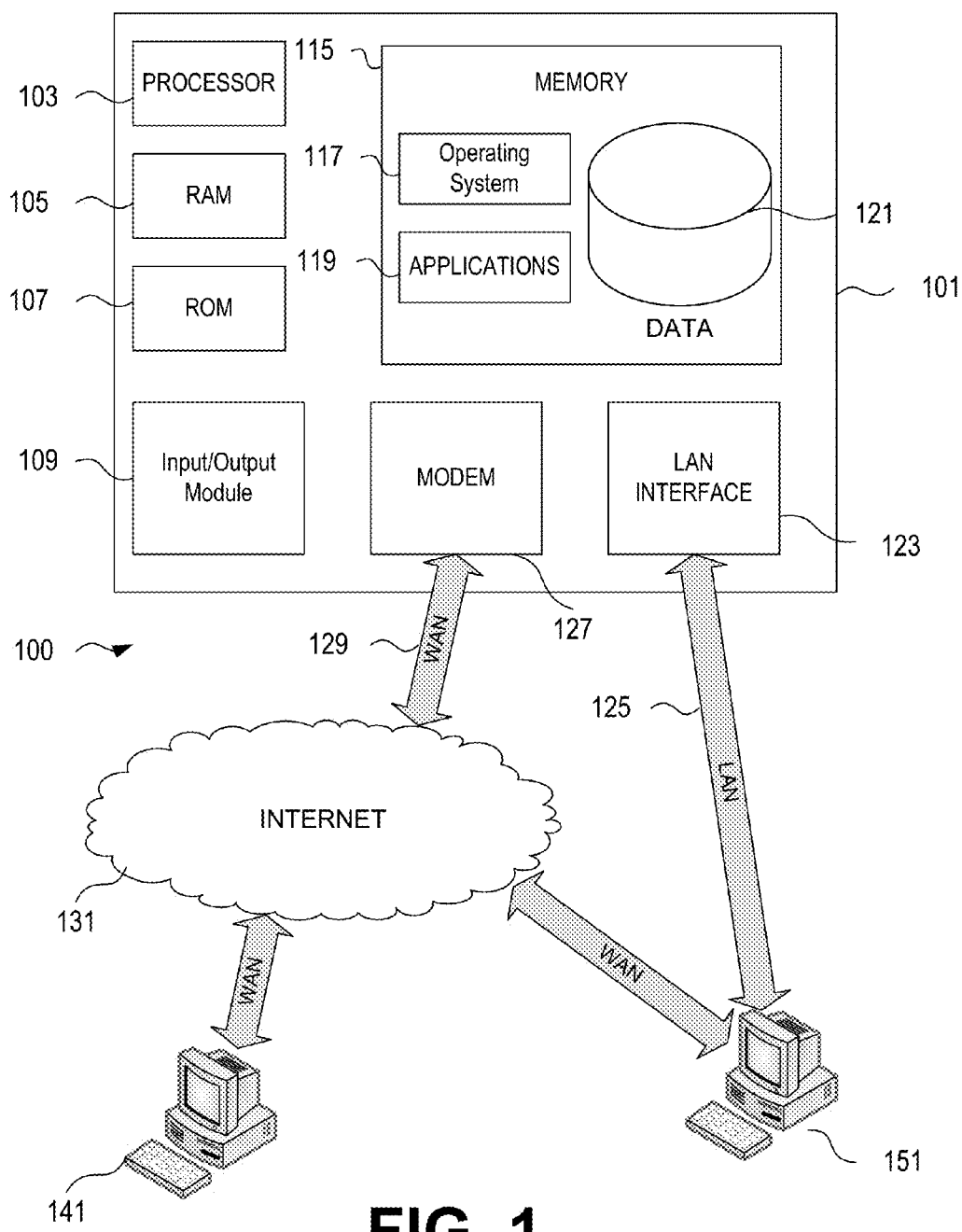
FIG. 1 illustrates an example of a suitable operating environment in which various aspects of the disclosure may be implemented.

FIG. 1 illustrates a block diagram of a generic computing device 101 (e.g., a computer server) in computing environment 100 that may be used according to an illustrative embodiment of the disclosure. The computer server 101 may have a processor 103 for controlling overall operation of the server and its associated components, including random access memory (RAM) 105, read-only memory (ROM) 107, input/output (I/O) module 109, and memory 115.

I/O 109 may include a microphone, mouse, keypad, touch screen, scanner, optical reader, and/or stylus (or other input device(s)) through which a user of server 101 may provide input, and may also include one or more of a speaker for providing audio output and a video display device for providing textual, audiovisual and/or graphical output. Software may be stored within memory 115 and/or other storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown).

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 may be connected to the LAN 125 through a network interface or adapter 123. When used in a WAN networking environment, the server 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Computing device 101 and/or terminals 141 or 151 may also be mobile terminals (e.g., mobile phones, PDAs, notebooks, and the like) including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by one or more computers and/or one or more processors associated with the computers. Generally, program modules include routines, programs, objects, components, data structures, and the like that perform particular tasks or implement particular abstract data types. Aspects of the disclosure may also be practiced in distributed computing environments where tasks are performed by remote processing devices that are linked through a communications network. In a distributed computing environment, program modules may be located in both local and remote computer storage media including memory storage devices.

The above-described systems may be used in various businesses, companies, organizations, entities, and the like to evaluate various locations to determine an optimum location for a provider, vendor, and the like. For instance, various computing systems may be used to evaluate criteria and factors, such as process criteria of a work function, as well as various provider attributes to recommend one or more provider and/or locations to provide the desired service or work function, as will be discussed more fully below.

Figure 2:
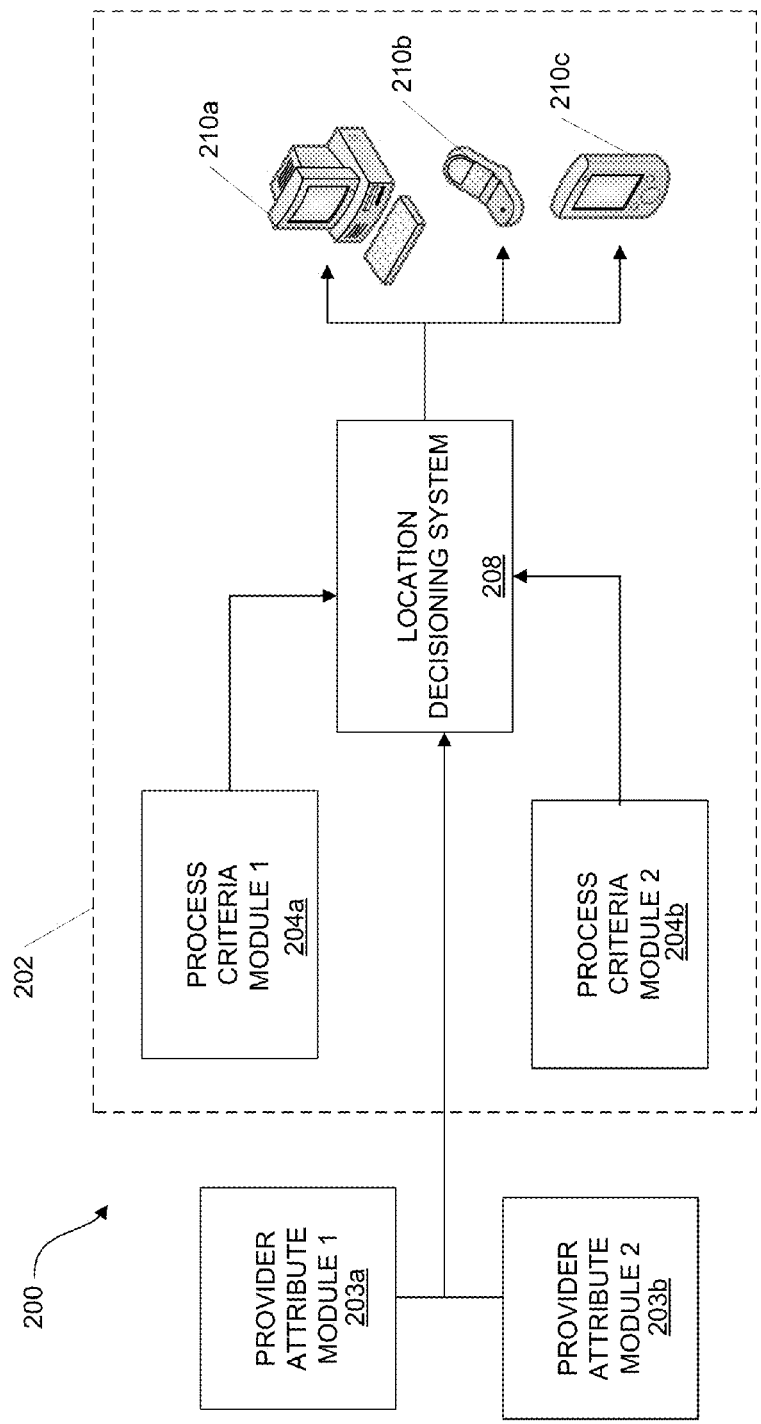
FIG. 2 illustrates an example system for determining a recommended location for performing a work function based on process criteria and provider attributes according to one or more aspects described herein.

FIG. 2 illustrates one example system for receiving and evaluating various process criteria and provider factors and determining a recommended provider. The system 200 may include a location decisioning system 208. In some examples, the location decisioning system 208 may be maintained within a company, business, organization, entity, and the like that implements the location decisioning system in formulating provider decisions. For instance, the location decisioning system may be located within a financial institution 202 and the financial institution may utilize the location decisioning system 208 in formulating decisions regarding choice of provider, choice or location in which to perform a work function, and the like. In other examples, the location decisioning system 208 may be located external to the entity implementing the system (for instance, not shown, the system 208 may be maintained by a service provider with which the entity may contract for using the location decisioning system 208).

The system 200 may further include one or more process criteria modules 204a and 204b. The process criteria modules 204a and 204b may include process criteria (such as work function, type of work, preferred work hours/hours of operation, communication skills desired (including languages spoken, writing skills, and the like), customer/client location, and the like) for one or more work functions, such as database administration, data entry, technical support, and the like, within the entity implementing the location decisioning framework (such as financial institution 202). The process criteria modules 204a and 204b may store information and, as requested, transmit information, including process criteria, about a particular work function to the location decisioning system 208. The process criteria of the identified work function may be transmitted to the location decisioning system 208 for evaluation to determine what, if any, other location may provide improvement.

The system 200 may further include one or more provider attribute modules 203a and 203b. The provider attribute modules 203a and 203b may store information regarding attributes of one or more providers in one or more locations and/or geographies. A provider may be an internal provider, such as a work group, individual, subsidiary, and the like of the entity implementing the framework. A provider may also include a supplier, such as an external provider of services not part of the entity implementing the framework.

The provider attribute modules 203a and 203b may store information such as type of work performed, flexibility of staffing, communication skills/capabilities, time zone of operation, time zone of desired provider, desired knowledge base of provider related to work function, duration of work function, flexibility of provider staffing, specialized skills of provider, and the like. This information may be transmitted to the location decisioning system for further processing.

In some examples, in addition to receiving process criteria from the process criteria modules 204a and 204b and provider attributes from the provider attribute modules 203a and 203b, additional process criteria and/or provider attribute information may be received at the location decisioning system 208 via user input, as will be discussed more fully below.

The location decisioning system 208 may receive the process criteria from one or more process criteria modules 204a and 204b and the provider attributes, such as from provider attribute modules 203a and 203b, and may evaluate the attributes and determine a recommended location for performing the work function identified as eligible for movement to another location to provide improved efficiency, creation of synergies, improved customer service, and the like. In some examples, the location decisioning system 208 may evaluate the type of work performed in the work function, the desired hours of operation, staffing needs, communication skills desired, and the like.

For instance, a work function may be focused around normal business hours in the Mountain Time zone (e.g., 8:00 a.m. to 5:00 p.m.). Accordingly, the Mountain Time zone and/or providers within that location may be desirable. The location decisioning module 208 may evaluate additional factors associated with the work function, such as type of oversight needed (e.g., whether management oversight will be necessary to ensure compliance with government regulations, and the like), the duration of the work function, whether the individuals performing the work function may be exposed to information best maintained within the entity (e.g., intellectual property including trade secrets, patentable inventions, and the like).

Based on the criteria, factors, attributes, and the like evaluated, the location decisioning system 208 may provide a recommendation for a location in which the work function should be performed in order to improve efficiency, and the like. In some examples, the recommendation may include one or more particular locations. In instances where multiple locations are recommended, a comparison of the benefits of the recommended locations may be provided. In other examples, the location decisioning system 208 may provide names, contact information, and the like of providers within the identified locations to perform the desired work function. In still other examples, the location decisioning system 208 may determine and/or provide a recommendation for performing the work function via a supplier (such as an external supplier not affiliated with the entity) or via a work group within the entity. In some arrangements, a hybrid recommendation may be desirable, such as performing a portion of the work function via a supplier and a portion via a work group within the entity.

The recommendation determined by the location decisioning system 208 may be provided to the user via one or more computing devices 210a-210c, such as a computer terminal 210a, a smart phone 210b, a personal digital assistant 210c, or other mobile device. The computing device 210 may also provide a user interface to the location decisioning system 208 to revise inputs (such as process criteria, provider attributes, and the like) and/or obtain additional information about the recommended locations.

Figure 3:
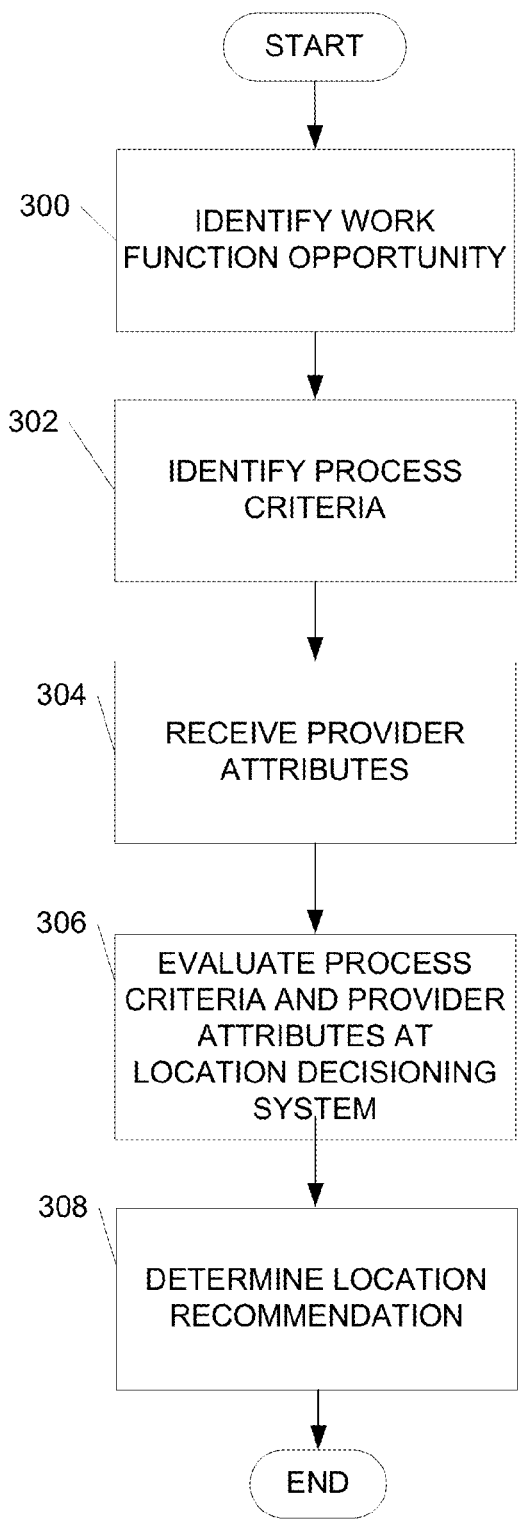
FIG. 3 illustrates one example method of determining a recommended location for performing a work function based on process criteria and provider attributes according to one or more aspects described herein.

FIG. 3 illustrates one example method of determining a location recommendation. In step 300, a work function opportunity is identified. As discussed above, a work function opportunity may include creation of a new work function and identification of a desirable location to perform the work function, and/or movement of a work function to a location other than the one in which the work function is currently performed. In step 302, process criteria (e.g., criteria associated with the identified work process) may be identified. Process criteria may include desired type of work being performed, profile of the work process, hours of operation, flexibility of staffing, desired communication skills (e.g., languages, dialects, and the like, spoken, writing skills, and the like), critical to quality measures, number of employees, and the like. In step 304, various provider attributes may be received.

In step 306, the received process criteria and provider attributes may be processed and evaluated, such as by a location decisioning module (208 in FIG. 2). In step 308 a location recommendation may be determined. Similar to the arrangement discussed above, the recommendation may be transmitted to a computing device, such as a user computer terminal, cell phone, smart phone, and the like.

In one illustrative example, a work function, such as work function 1, may be identified as including an opportunity to perform the work function in a location other than the one in which it is currently performed. Accordingly, process criteria of that work function, such as hours of operation for the database administration, desired time zone of provider performing the work function, desired communication skills, and the like may be identified and transmitted to the location decisioning system (such as system 208 in FIG. 2). Various provider attributes may then be identified, such as communication skills of the providers in various locations, flexibility of staffing, time zone, and the like, and transmitted to the location decisioning system. These attributes may be processed and one or more locations may be identified as recommended for performing work function 1.

Figure 4A:
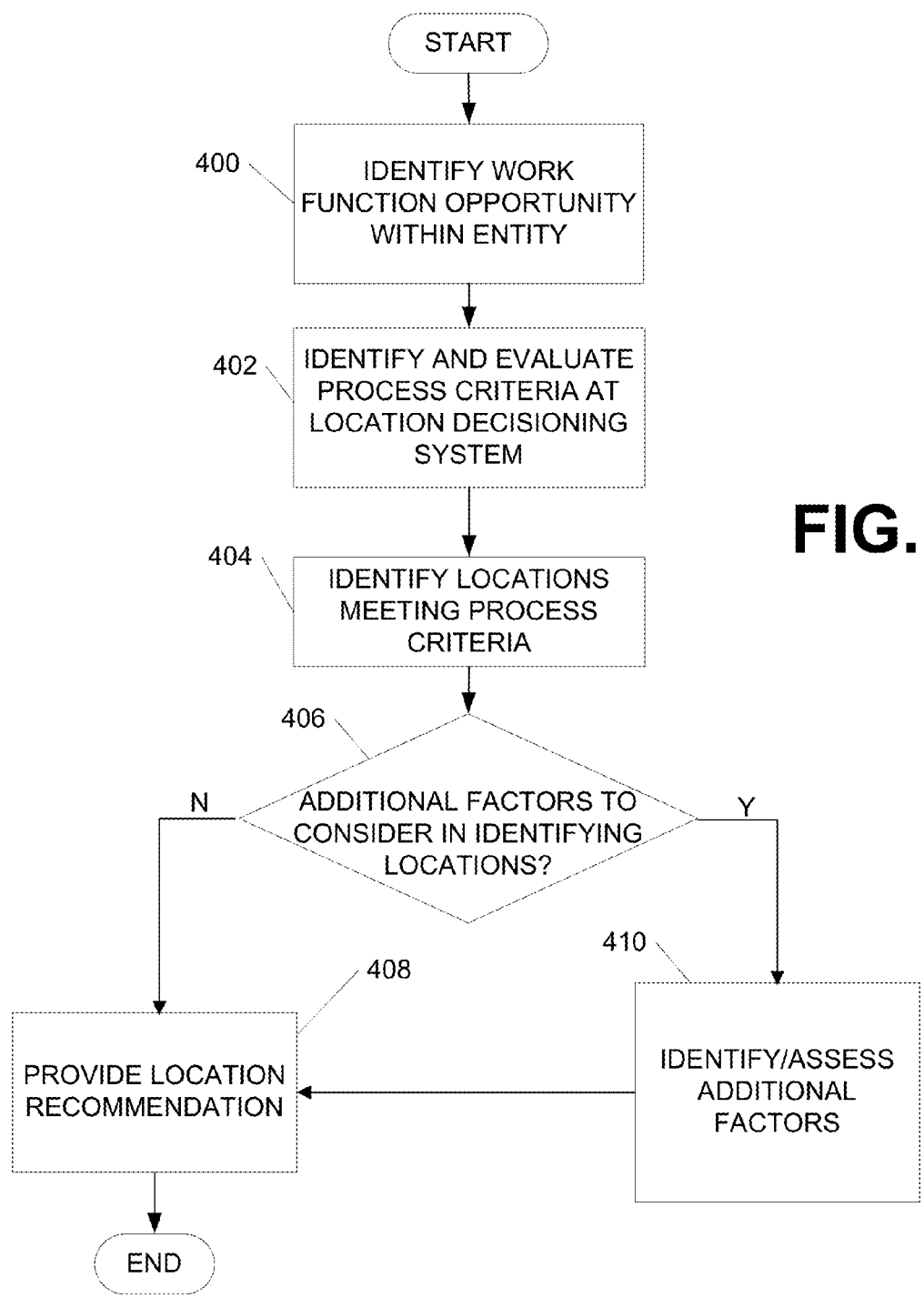
FIGS. 4A and 4B illustrate another example method of determining a recommended location and delivery model for performing a work function based on process criteria and provider attributes according to one or more aspects described herein.

FIG. 4A illustrates one example method of determining one or more locations for performing a work function based on various process criteria and provider attributes. In step 400, a work function opportunity may be identified. In step 402, various process criteria may be identified and evaluated, for instance, at the location decisioning system. In step 404, one or more locations meeting the identified process criteria may be identified. In step 406, a determination is made as to whether additional factors should be considered in identifying one or more locations to perform the work process. For instance, some additional factors that may be considered are the nature of the information to which the provider will be exposed. For example, if the information is non-public or privileged that may reduce or eliminate one or more external providers or location and instead favor one or more internal providers or locations. Another example factor may be whether intellectual property is involved in the work function. Still other additional factors may include whether knowledge retention or experience in the area is desired, whether management oversight is desired, whether particular skills are desired, flexibility of staffing, and the like.

If there are no additional factors to consider in step 406, a location recommendation may be provided. Alternatively, if other factors should be considered in step 406, those factors may be identified and/or assessed in step 408. The location recommendation based on those additional factors, as well as the process criteria, may then be provided in step 406.

Figure 4B:
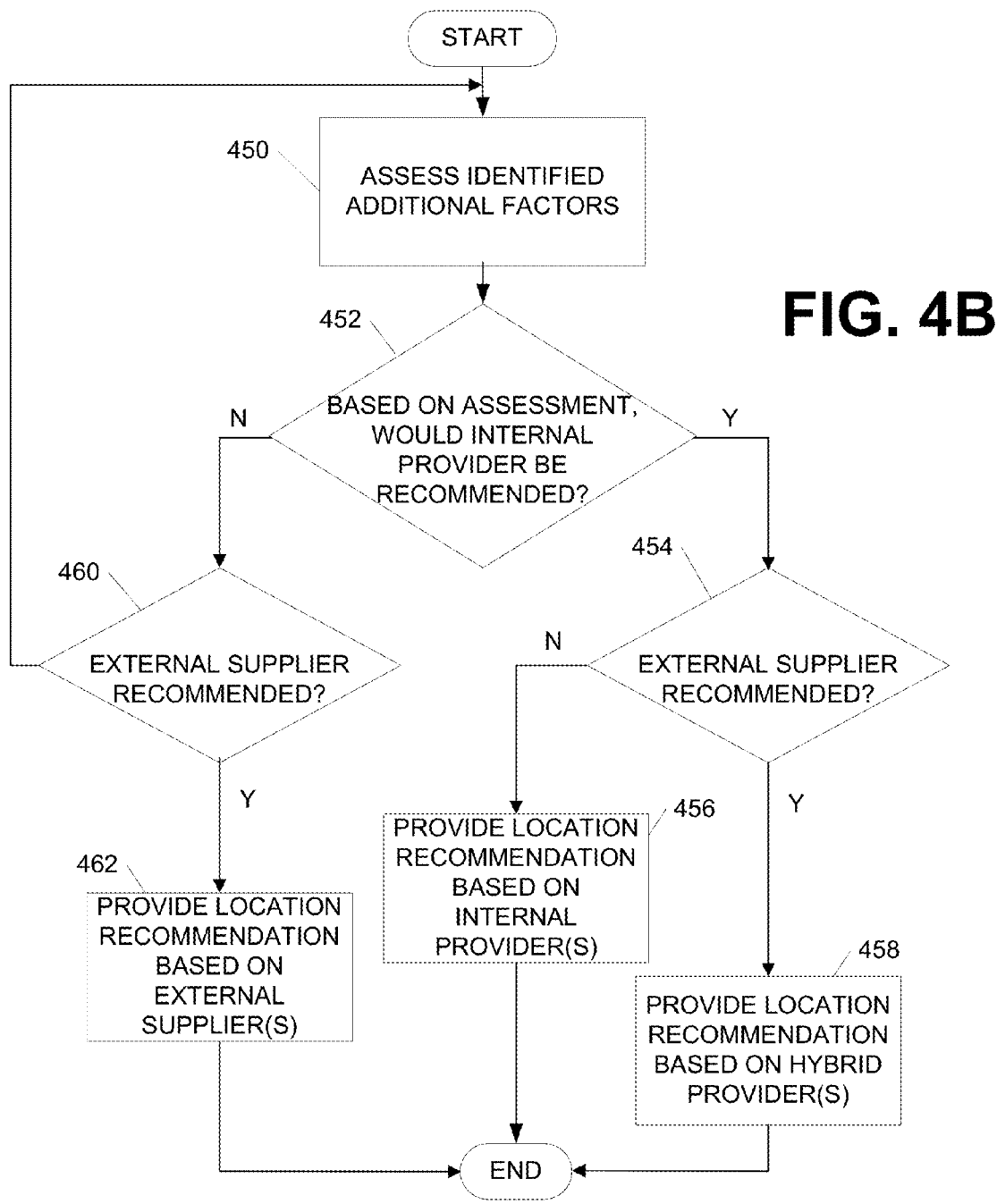

FIG. 4B is an example method of identifying and/or assessing additional factors (e.g. steps 406 and 408 in FIG. 4A) to determine a delivery model for the work function and associated location recommendations based on the delivery model. In step 450, the identified additional factors are assessed. Assessment of additional factors may include the factors discussed above. Additionally or alternatively, assessment of additional factors may include factors associated with a delivery model of the work function (e.g., whether an internal provider, external supplier, or hybrid mix (i.e., combination of internal providers and external suppliers) is appropriate). For example, delivery model factors may include whether an internal provider or an external supplier has been identified or recommended based on the previously identified process criteria and additional factors, whether the work function would benefit from a combination of internal providers and external suppliers, and the like. In some arrangements, the additional factors may be assessed and given a score. The score may then be the basis for determining whether an internal, external, or hybrid arrangement is desired. For instance, if each response of "yes" to an additional factor is given a score of 1, then a score over a predetermined threshold, (e.g., 5, 7, and the like) may equate to a recommendation of internal providers. Alternatively, if the score is below the predetermined threshold, a recommendation of external suppliers may be made. In still other arrangements, if the score is within a particular ranged of the threshold (e.g., the threshold is 5 and the score is between 3 and 7) a hybrid recommendation may be made. This scoring system is merely one example of providing a delivery model recommendation. Several other ways of determining one or more appropriate delivery models may be used without departing from the invention. Additionally or alternatively, one or more factors, as well as one or more process criteria, provider attributes, and the like may be weighted to indicate greater importance of that factor than other factors being considered.

In step 452, a determination is made as to whether an internal provider would be recommended for this work function. If so, a determination is made in step 454 as to whether an external supplier may be recommended for this work function. If not, a location recommendation may be made based on internal providers performing the work function in step 456. If an external supplier is recommended in step 454, a location recommendation may be made based on a hybrid arrangement (e.g., internal and external providers) in step 458.

Alternatively, if, in step 452, an internal provider is not recommended, a determination may be made in step 460 as to whether an external supplier is recommended. If no external supplier is recommended, the method may return to step 450 to further assess additional factors associated with the work function. However, if an external supplier is recommended in step 460, a location recommendation may be made based on external suppliers performing the work function in step 462.

In some examples, the system or framework may be accessible via a user computing device, such as a computer terminal, cell phone, smart phone, PDA, and the like. For instance, the framework/system may be accessible via a network, such as the Internet, from a home page or other website (e.g. intranet) associated with the entity implementing the framework. In other examples, the framework/decisioning system may be accessible via an intranet of the entity.

Figure 5:
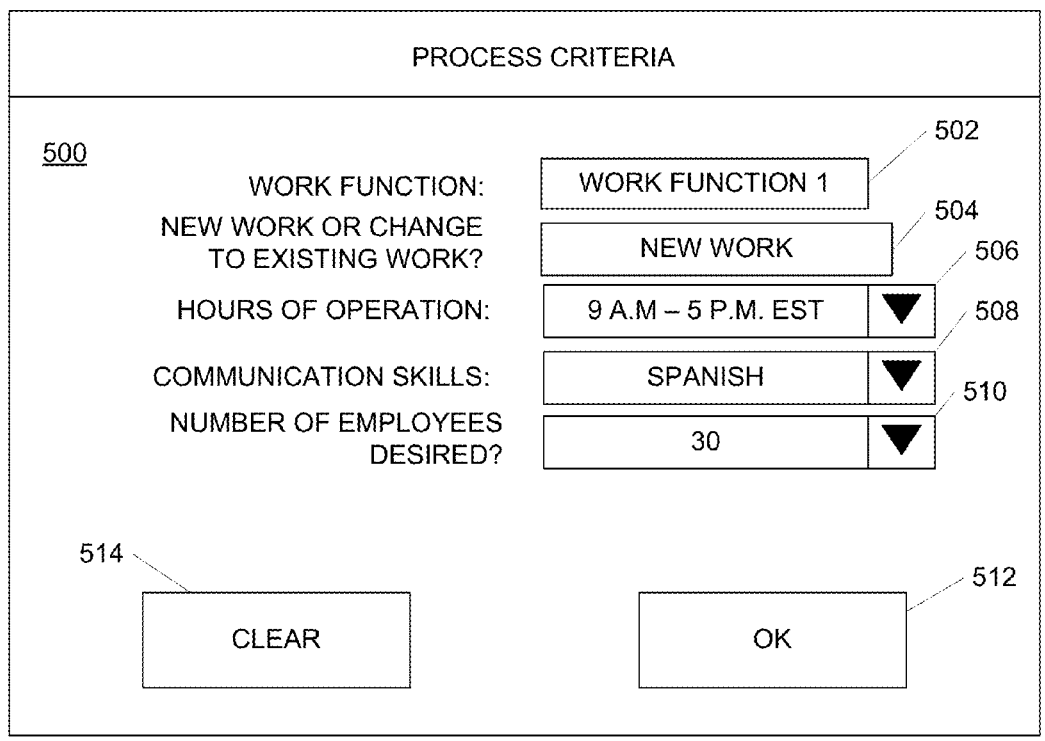
FIG. 5 illustrates one example user interface for providing process criteria information according to one or more aspects described herein.

FIG. 5 illustrates one example user interface 500 for providing process criteria to the decisioning framework. The interface 500 includes field 502 in which the work function may be identified. In field 504, a user may indicate whether the work function is a new work function (e.g., a work function not currently being performed) or an existing work function that may be looking for a location change to provide efficiency improvement, create synergies, improve customer service, and the like. In field 506, a user may indicate desired hours of operation for the work function. In some examples, the desired hours of operation may be selected from a drop-down menu or may be directly input by the user by clicking or double-clicking in the field and indicating the desired hours. Field 508 includes desired communication skills, such as languages spoken, dialect spoken, level of written communication desired, and the like. Field 510 indicates a desired number of employees to perform the work function. Additional process criteria may be provided in addition to or in place of some or all of the criteria shown in FIG. 5 without departing from the invention. The process criteria shown in FIG. 5 are merely example criteria that may be evaluated. The interface further includes an "ok" selection 512 to process the process criteria or a "clear" option 514 to clear all inputs and return them to default settings or leave them blank.

Figure 6:
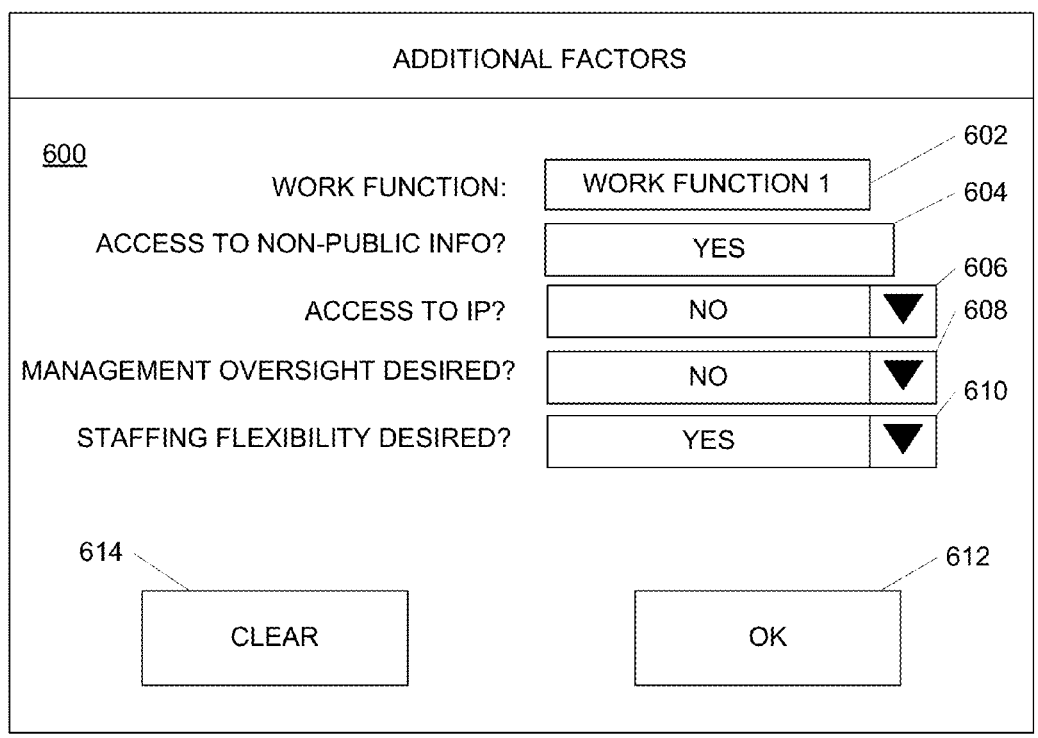
FIG. 6 illustrates one example user interface for providing additional factors for assessment to the location decisioning system according to one or more aspects described herein.

FIG. 6 illustrates one example user interface 600 for providing additional factors to assess.

Field 602 indicates the work function being evaluated. In field 604 a user may indicate whether performance of the work function includes access to non-public or privileged information. Field 606 indicates whether performing the work function includes access to intellectual property, while field 608 indicates whether management oversight may be desired. For instance, if the work function includes aspects that are regulated by law, require specific procedures to comply with government or legal regulations, standards, and the like, additional management oversight may be desired to ensure procedures are being complied with, paperwork is properly maintained, and the like. Field 610 indicates whether flexible staffing may be desired. Additional factors may be provided in addition to or in place of some or all of the factors shown in FIG. 6 without departing from the invention. For instance, long-term or overall plans for the movement of performance of the work function may be included. The factors shown in FIG. 6 are merely example additional factors that may be assessed. The interface further includes an "ok" selection 612 to process the additional factors or a "clear" option 614 to clear all inputs and return them to default settings or leave them blank.

Figure 7:
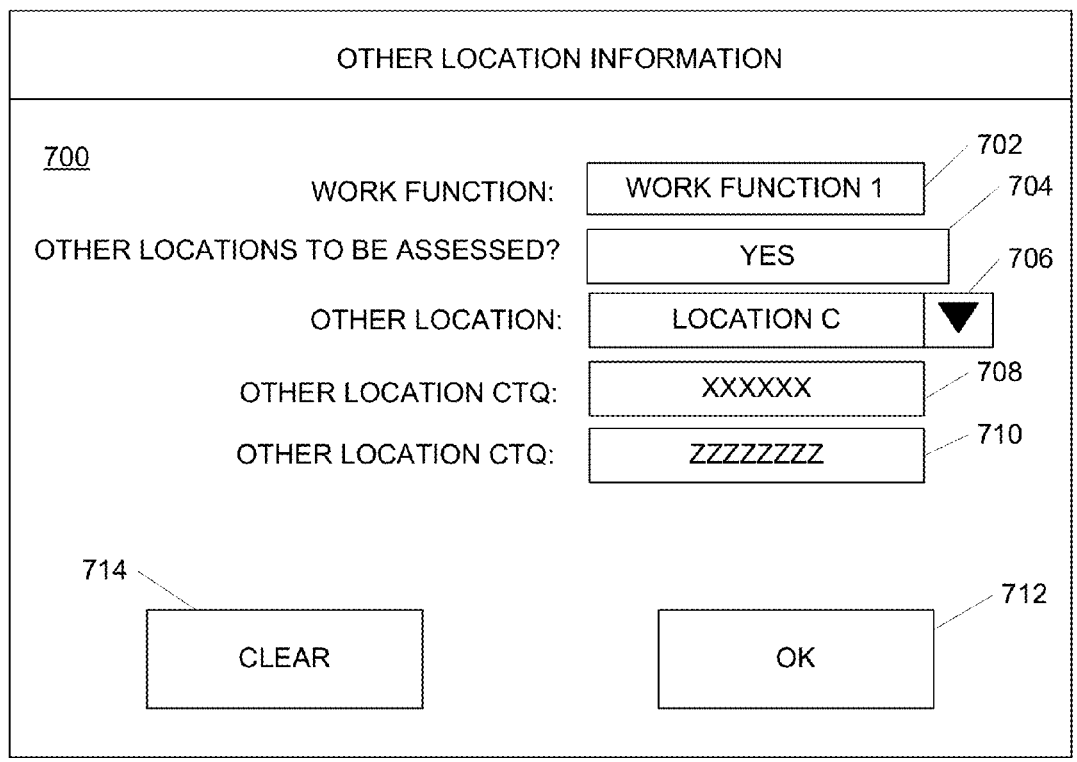
FIG. 7 illustrates one example user interface for identifying other locations to be considered according to one or more aspects described herein.

FIG. 7 illustrates one example user interface 700 for identifying other locations to be considered beyond those recommended by the location recommendation system, and various measures associated with those locations. Field 702 identifies the work function being evaluated. Field 704 may indicate whether other locations will be considered and/or assessed and field 706 indicates the additional locations being assessed. Similar to fields in other example user interfaces discussed, the additional location may be selected from a drop-down menu (as shown in FIG. 7) or it may be input by a user, may have a selectable radio button associated with it, and the like.

Fields 708 and 710 are available to indicate one or more critical to quality measures that may be used to evaluate or assess the additional locations. Critical to quality measures may include: whether there is existing infrastructure in place to perform the work function, whether specific niche skills are available at the location, whether specific line of business efficiencies exist at the location, and the like. Interface 700 further includes an "ok" option 712 to process the information input and a "clear" option 714 to clear the inputs or return them to a default setting.

Figure 8:
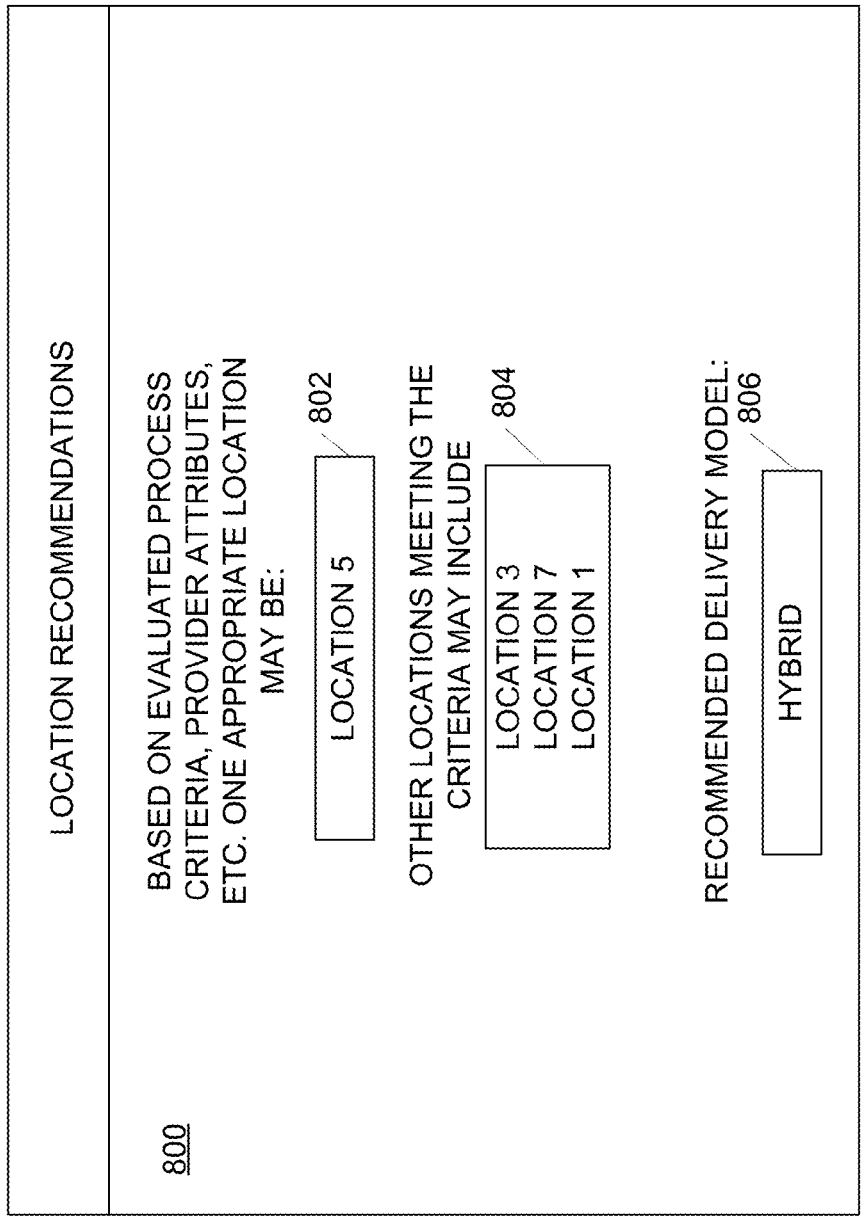
FIG. 8 illustrates one example user interface providing a recommendation for one or more locations according to one or more aspects described herein.

FIG. 8 illustrates one example user interface 800 providing a location recommendation according to one or more aspects described herein. Field 802 indicates a recommended location based on an evaluation of the process criteria, provider attributes, additional factors, and the like. Field 802 may include one or more recommended locations. Field 804 indicates other locations that may meet the evaluation criteria. Field 804 may include one or more additional locations. Field 806 indicates a recommended delivery model for performing the work function (e.g., internal provider, external supplier, hybrid, and the like). Although the recommended delivery model is shown in text, in some arrangements, the recommendation may, additionally or alternatively, be depicted graphically, such as a position on a scale, chart, graph, and the like.

One illustrative example of various aspects of the invention is provided below. However, this is merely one example and nothing in the specification is intended to limit aspects of the invention to the features, and the like recited in the below example.

In one illustrative example, a work function at Company A may be identified as an opportunity for efficiency improvement and/or improved customer service by performing the work function in a location other than the current location. The work function may be identified as better performed (e.g., more efficient, providing improved customer service, and the like) in a different location due to desired hours of operation. Accordingly, a user at Company A may implement at least some aspects of the decisioning framework, such as via a user interface provided on the Company A intranet. The user may then provide various process criteria and provider attributes associated with the work function, such as via, for example, user interfaces 500-700 in FIGS. 5-7. In one example, the process criteria may include hours of operation and time zone of operation and the provider attributes may include work hours of the providers in the location and/or time zone of the location. In some examples, an evaluation may be performed as to whether the work function is eligible for a hybrid-type work arrangement, and whether such an arrangement would be advantageous.

Upon completion, the decisioning system may provide one or more recommended locations for performing the work function. For instance, a user interface similar to interface 800 in FIG. 8, may provide one or more recommended locations The recommendations may be made based on the process criteria and/or provider attributes including, in this example, hours of operation, time zone, and the like. The recommended locations may then be further evaluated to determine the desired location to perform the work function. In some examples, this further evaluation may include considering other locations (e.g., locations not recommended in interface 800).

The above described decisioning framework may provide a consistent decisioning tool to aid in determining whether a work function should be moved to an alternate location and/or recommending advantageous locations for performing the work function. Use of the framework may aid in providing consistency across the process by relying on substantially similar factors, attributes, and the like for each location decision, thereby reducing the use of subjective factors in the location decisioning process.

The methods and features recited herein may further be implemented through any number of non-transitory computer readable media that are able to store computer readable instructions. Examples of non-transitory computer readable media that may be used include RAM, ROM, EEPROM, flash memory or other memory technology, CD-ROM, DVD, or other optical disc storage, magnetic cassettes, magnetic tape, magnetic storage and the like.

While illustrative systems and methods described herein embodying various aspects are shown, it will be understood by those skilled in the art that the disclosure is not limited to these embodiments. Modifications may be made by those skilled in the art, particularly in light of the foregoing teachings. For example, each of the elements of the aforementioned embodiments may be utilized alone or in combination or sub-combination with the elements in the other embodiments. It will also be appreciated and understood that modifications may be made without departing from the true spirit and scope of the present disclosure. The description is thus to be regarded as illustrative instead of restrictive on the present disclosure.

What is claimed is:

1. A method, comprising:
receiving, by a location decisioning system of a first computing device, a plurality of process criteria for a work function associated with an organization;
receiving, by the location decisioning system, a plurality of provider attributes associated with the work function;
receiving, by the location decisioning system, a plurality of additional factors associated with the work function, the plurality of additional factors including whether information associated with the work function is non-public or privileged, whether intellectual property is involved with the work function, whether knowledge retention is desired for the work function, and whether management oversight is desired for the work function; and
determining, by the location decisioning system, a recommended location in which to perform the work function associated with the organization based on the received plurality of process criteria for the work function, the received plurality of provider attributes associated with the work function, and the received plurality of additional factors associated with the work function, wherein the recommended location in which to perform the work function associated with the organization is determined based at least in part on the plurality of additional factors, including whether information associated with the work function is non-public or privileged, whether intellectual property is involved with the work function, whether knowledge retention is desired for the work function, and whether management oversight is desired for the work function.

2. The method of claim 1, wherein the received plurality of process criteria includes at least one of: a language desired to perform the work function, a type of work function, a location the work function is currently performed in, and hours of operation desired for the work function.

3. The method of claim 1, wherein the received plurality of provider attributes includes at least one of: management oversight required for the work function, time zone of a provider, language of a provider, knowledge base of a provider related to the work function, duration of the work function, whether the work function provides provider access to intellectual property, flexibility of provider staffing, and specialized skills of a provider.

4. The method of claim 1, wherein determining the recommended location includes determining a plurality of recommended locations.

5. The method of claim 1, wherein determining the recommended location includes determining whether the work function is to be performed by a hybrid arrangement including both a work group internal to the organization and a supplier external to the organization.

6. The method of claim 1, wherein one or more of the received plurality of process criteria includes a weighting value.

7. The method of claim 1, wherein one or more of the received plurality of provider attributes includes a weighting value.

8. A method, comprising:
receiving, by a location decisioning system at a first computing device, a process criteria for a work function associated with an organization;
receiving, by the location decisioning system, a provider attribute including a desired quality of a provider performing the work function;
receiving, by the location decisioning system, a plurality of additional factors associated with the work function, the plurality of additional factors including whether information associated with the work function is non-public or privileged, whether intellectual property is involved with the work function, whether knowledge retention is desired for the work function, and whether management oversight is desired for the work function;
determining, by the location decisioning system, whether the work function is eligible to be performed by an internal work group of the organization and a supplier external to the organization; and
responsive to determining that the work function is eligible to be performed by an internal work group of the organization and a supplier external to the organization, determining, by the location decisioning system, a recommended location in which to perform the work function associated with the organization based on the received process criteria for the work function, the received provider attribute, including the desired quality of the provider performing the work function, the received plurality of additional factors associated with the work function, and the determination that the work function is eligible to be performed by an internal work group of the organization and a supplier external to the organization, wherein the recommended location in which to perform the work function associated with the organization is determined based at least in part on the plurality of additional factors, including whether information associated with the work function is non-public or privileged, whether intellectual property is involved with the work function, whether knowledge retention is desired for the work function, and whether management oversight is desired for the work function.

9. The method of claim 8, further including,
responsive to determining the recommended location, determining, by the location decisioning system, whether the recommended location includes an internal work group and an external supplier; and
responsive to determining that the recommended location includes an internal work group and an external supplier, determining, by the location decisioning system, whether the work function is to be performed by both the internal work group and the external supplier.

10. The method of claim 8, wherein responsive to determining that the work function is not eligible to be performed by an internal work group and an external supplier, determining, by the location decisioning system, a recommended location in which to perform the work function associated with the organization based on the received process criteria, the received provider attribute and the determination that the work function is not eligible to be performed by the internal work group and the external supplier.

11. The method of claim 8, wherein determining the recommended location includes determining a plurality of recommended locations.

12. The method of claim 8, wherein the received process criteria includes at least one of: a language desired to perform the work function, a type of work function, a location the work function is currently performed in, and hours of operation desired for the work function.

13. The method of claim 8, wherein the received provider attribute includes at least one of: management oversight required for the work function, a time zone of a provider, a language of a provider, knowledge base of a provider related to the work function, a duration of the work function, whether the work function provides a provider access to intellectual property, flexibility of provider staffing, and specialized skills of a provider.

14. One or more non-transitory computer readable media storing computer readable instructions that, when executed, cause an apparatus to:
receive a process criteria for a work function associated with an organization;
receive a provider attribute including a desired quality of a provider performing the work function;
receive a plurality of additional factors associated with the work function, the plurality of additional factors including whether information associated with the work function is non-public or privileged, whether intellectual property is involved with the work function, whether knowledge retention is desired for the work function, and whether management oversight is desired for the work function;
determine that the work function is eligible to be performed by an internal work group internal to the organization and a supplier external to the organization;
determine that performing the work function by the internal work group of the organization and the supplier external to the organization is desired; and
responsive to determining that performing the work function by the internal work group of the organization and the supplier external to the organization is desired, determine a recommended location in which to perform the work function associated with the organization based on the received process criteria for the work function, the received provider attribute, including the desired quality of the provider performing the work function, the received plurality of additional factors associated with the work function, and the determination that performing the work function by the internal work group of the organization and the supplier external to the organization is desired, wherein the recommended location in which to perform the work function associated with the organization is determined based at least in part on the plurality of additional factors, including whether information associated with the work function is non-public or privileged, whether intellectual property is involved with the work function, whether knowledge retention is desired for the work function, and whether management oversight is desired for the work function.

15. The one or more non-transitory computer readable media of claim 14, wherein the computer readable instructions, when executed, cause the apparatus to, responsive to determining that the work function is not eligible to be performed by the internal work group of the organization and the supplier external to the organization, determine a recommended location in which to perform the work function associated with the organization based on the received process criteria, the received provider attribute and the determination that the work function is not eligible to be performed by the internal work group of the organization and the supplier external to the organization.

16. The one or more non-transitory computer readable media of claim 14, wherein the computer readable instructions, when executed, cause the apparatus to determine the recommended location by determining a plurality of recommended locations.

17. The one or more non-transitory computer readable media of claim 14, wherein the received process criteria include at least one of: language desired to perform the work function, type of work function, a location the work function is currently performed in, and hours of operation desired for the work function.

18. The one or more non-transitory computer readable media of claim 14, wherein the received provider attribute includes at least one of: management oversight required for the work function, a time zone of a provider, language of a provider, knowledge base of a provider related to the work function, duration of the work function, whether the work function provides provider access to intellectual property, flexibility of provider staffing, and specialized skills of a provider.

19. An apparatus comprising:
a processor; and
memory operatively coupled to the processor and storing computer readable instructions that, when executed, cause the apparatus to:
receive a process criteria for a work function associated with an organization;
receive a provider attribute including a desired quality of a provider performing the work function;
receive a plurality of additional factors associated with the work function, the plurality of additional factors including whether information associated with the work function is non-public or privileged, whether intellectual property is involved with the work function, whether knowledge retention is desired for the work function, and whether management oversight is desired for the work function;
determine whether the work function is eligible to be performed by an internal work group internal to the organization and a supplier external to the organization; and
responsive to determining that the work function is eligible to be performed by an internal work group of the organization and a supplier external to the organization, determine a recommended location in which to perform the work function associated with the organization based on the received process criteria for the work function, the received provider attribute, including the desired quality of the provider performing the work function, the received plurality of additional factors associated with the work function, and the determination that the work function is eligible to be performed by an internal work group of the organization and a supplier external to the organization, wherein the recommended location in which to perform the work function associated with the organization is determined based at least in part on the plurality of additional factors, including whether information associated with the work function is non-public or privileged, whether intellectual property is involved with the work function, whether knowledge retention is desired for the work function, and whether management oversight is desired for the work function.

20. The apparatus of claim 19, wherein the computer readable instructions, when executed, cause the apparatus to:

responsive to determining the recommended location, determine, whether the recommended location includes an internal work group and an external supplier; and responsive to determining that the recommended location includes an internal work group and an external supplier, determine whether the work function is eligible to be performed by both the internal work group and the external supplier.

21. The apparatus of claim 19, wherein the computer readable instructions, when executed, cause the apparatus to:

responsive to determining that the work function is not eligible to be performed by an internal work group and an external supplier, determine, a recommended location in which to perform the work function associated with the organization based on the received business attribute, the received provider attribute and the determination that the work function can not be performed by the internal work group and the external supplier.

22. The apparatus of claim 19, wherein the computer readable instructions, when executed, cause the apparatus to determine the recommended location by determining a plurality of recommended locations.

* * * * *

UNITED STATES PATENT AND TRADEMARK OFFICE
CERTIFICATE OF CORRECTION

| | | |
|---|---|---|
| PATENT NO. | : 8,396,733 B2 | Page 1 of 1 |
| APPLICATION NO. | : 12/900649 | |
| DATED | : March 12, 2013 | |
| INVENTOR(S) | : Kenton C. Smith et al. | |

It is certified that error appears in the above-identified patent and that said Letters Patent is hereby corrected as shown below:

In the Claims

In Column 13, Claim 20, Line 15:
   Please replace "determine, whether" with --determine whether--.

In Column 14, Claim 21, Line 8:
   Please replace "determine, a recommended" with --determine a recommended--.

Signed and Sealed this
Twenty-fourth Day of June, 2014

Michelle K. Lee
*Deputy Director of the United States Patent and Trademark Office*